United States Patent [19]
Kachel

[11] 3,764,901
[45] Oct. 9, 1973

[54] METHOD OF AND MEASURING CHAMBER FOR MEASURING PROPERTIES OF PARTICLES SUSPENDED IN LIQUID

[75] Inventor: Volker Kachel, Gauting, Germany

[73] Assignee: Max-Planck-Gesellschaft zur Forderung der Wissenschaften e.V., Gottingen, Germany

[22] Filed: Apr. 27, 1972

[21] Appl. No.: 248,006

[30] Foreign Application Priority Data
Apr. 28, 1971  Germany.................. P 21 20 793.2

[52] U.S. Cl. .......................................... 324/71 CP
[51] Int. Cl. .......................................... G01n 27/00
[58] Field of Search ..................... 324/71 CP, 71 R

[56] References Cited
UNITED STATES PATENTS
3,648,160  3/1972  Beaver............................ 324/71 CP OTHER PUBLICATIONS
Spielman et al.; J. Coll. & Interpaet Sci., 26; 1968; pg. 175–182.

Primary Examiner—Alfred E. Smith
Attorney—Edwin E. Greigg

[57] ABSTRACT

In a measuring chamber, in a space immediately upstream of a measuring opening, there are disposed, for each measuring step, at least two entrance tubules from which particle suspensions are introduced into an electrolyte flow in such a manner that the particle flow paths within the measuring opening are each at the same radial distance from the center of the measuring opening or from the edge thereof. The outlet openings of the said at least two entrance tubules are arranged at identical distances from, and in rotational symmetry with respect to the axis of the measuring opening. One of the tubules contains a sample suspension and is, by mechanical operation, replaceable by another tubule to effect a series of tests, while the other tubule contains a calibrating suspension for calibrating the electric pulses generated upon passage of the sample suspension through said measuring opening.

13 Claims, 5 Drawing Figures

PATENTED OCT 9 1973

3,764,901

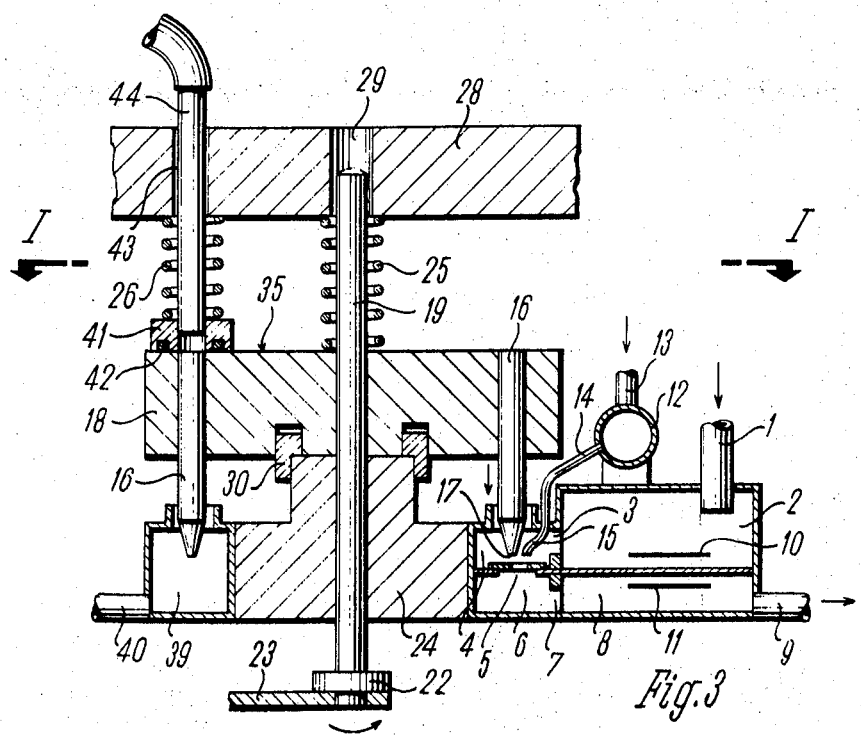
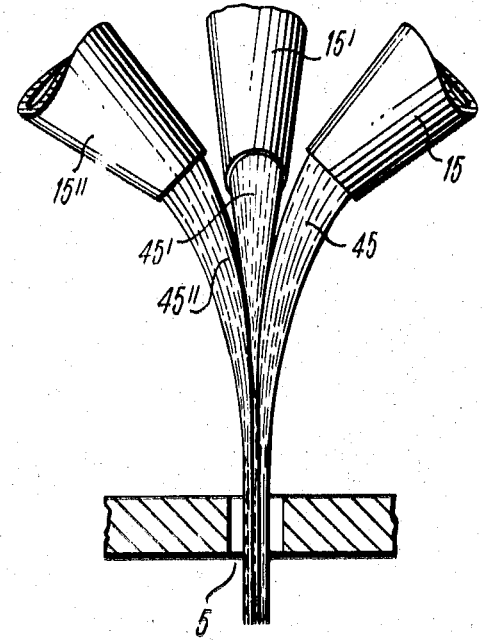
Fig.3
Fig.4

METHOD OF AND MEASURING CHAMBER FOR MEASURING PROPERTIES OF PARTICLES SUSPENDED IN LIQUID

BACKGROUND OF THE INVENTION

This invention relates to a method of and a measuring chamber for measuring certain properties of particles suspended in liquid. These particles are introduced by means of an entrance tubule in a space upstream of a measuring opening into a flowing liquid which carries the particles through the measuring opening. The entrance tubule which is formed as a thin-walled, elongate capillary tube, is arranged upstream of the adjacent outer edge of the measuring opening at such a distance therefrom and further, the diameter of the measuring opening is so designed that at the location where the entrance tubule is situated, the zone of the liquid flow undergoes a significant focusing in the direction of the measuring opening. Further, the axis of the entrance tubule is offset with respect to the axis of the measuring opening. The above-outlined features are disclosed in German Published Application DOS No. 2,013,799, laid open on Oct. 7, 1971. To this German application there corresponds U.S. application Ser. No. 126,128, filed Mar. 19, 1971. With the aid of a measuring chamber characterized by the above features, a measurement of volume distribution, absorption properties with respect to certain radiations or fluorescent properties of the aforenoted suspended particles may be effected.

The present invention is particularly concerned with the measurement of volume distribution wherein the relative proportion of particles of a given volume is determined in a totality of particles under examination. In a measuring chamber as disclosed in the aforenoted German Published Application No. 2,013,799, the particles suspended in a liquid (sample suspension) are introduced into the flow field of an electrolyte upstream of a measuring opening and are drawn, together with the electrolyte, through the measuring opening. By means of electrodes disposed at either side of the measuring opening, there is generated in the latter a predetermined electric field which, during the passage of a particle, is changed causing a change in the resistance of the electrolyte. This occurrence, in turn, leads to the generation of a pulse transmitted to a measuring apparatus which is connected to the electrodes. These pulses contain information regarding the volume of the particle passing through the measuring opening. The evaluation of these pulses leads to the information regarding the volume distribution. A description of the related general principles is set forth in U.S. Pat. No. 2,656,508. The amplitude and configuration of the pulses depend in a very significant degree of that exact location within the measuring opening through which the flow path of the electrolyte that carries the particles passes as it traverses the measuring opening. This feature is discussed in the following article:

V. Kachel, H. Metzger and R. Ruhenstroth-Bauer, "Der Einfluss der Partikeldurchtrittsbahn auf die Volumenverteilungskurven nach dem Coulter-Verfahren", Zeitschrift fur die gesamte experimentelle Medizin, Vol. 153, (1970), pp 331-347, published by Springer.

A measuring chamber as disclosed in the aforeidentified German Published Application No. 2,013,799 makes it possible - as opposed to earlier solutions, such as described in:

Lloyd Spielman and Simon L. Goren, "Improving Resolution in Coulter Counting by Hydrodynamic Focusing", Journal of Colloid and Interface Science Vol. 26 (1968), pages 175-182, or in German Published Application No. 1,806,512 - to exactly determine and freely select the location of passage of the particle suspension through the measuring opening without high cost and work input regarding the accuracy and machining of the measuring opening. It is a particular feature of the measuring chamber disclosed in German Published Application No. 2,013,799, to abandon the coaxial arrangement of the axis of the entrance tubule with respect to the axis of the measuring opening.

The present invention is based on the aforenoted advantageous arrangement.

SUMMARY AND ADVANTAGES OF THE INVENTION

Briefly stated, according to the invention, there is provided an improved measuring chamber of the type as disclosed in German Published Application No. 2,013,799 in which the liquid travels towards and through the measuring opening in a substantially focused path and which is provided with at least one additional entrance tubule disposed in the zone of the measuring opening and having an axis offset with respect to the axis of the measuring opening. The measuring chamber, according to the invention, is further characterized in that the entrance tubules are disposed at identical distances from, and in rotational symmetry with respect to the axis of the measuring opening.

According to the invention, to the measuring chamber there is added, by means of an entrance tubule, a suspension which serves for the calibration of the measuring pulses generated, during the passage of the particles through the measuring opening, between the two electrodes disposed at either side of the measuring opening. The process according to the invention is characterized by the steps of admitting, in sequence, to the space upstream of the measuring opening a plurality of entrance tubules containing different sample suspensions and subsequently cleaning the tubules.

By virtue of the aforeoutlined features, there is provided a novel measuring chamber and method of measuring certain properties of particles suspended in liquid which simplify the heretofore extremely time consuming and circumstantial calibration of the pulses generated at the electrodes and the positioning of the entrance tubules each containing a different sample.

It is an advantage of the invention that a manual washing of the inlet tubules is no longer necessary. Further, a coaxial arrangement between the entrance tubules and the measuring opening, which under certain circumstances can be achieved only with difficulty, is not required. Also, several samples may be simultaneously measured and the calibration of measuring pulses may be performed simultaneously and thus continuously controlled.

The apparatus according to the invention is particularly adapted for conducting blood test series in clinics or doctors' private laboratories and thus makes possible a substantial expansion of testing methods.

The invention will be better understood, as well as further objects and advantages become more apparent,

BRIEF DESCRIPTION OF THE DRAWING

FIG. 3 is a sectional view along line III—III of FIG. 1;

FIG. 4 is a side elevational view of the course of several particle flow paths through a measuring opening and FIG. 5 is a top plan view of the arrangement shown in FIG. 4.

DESCRIPTION OF THE PREFERRED EMBODIMENT

Figure 1:
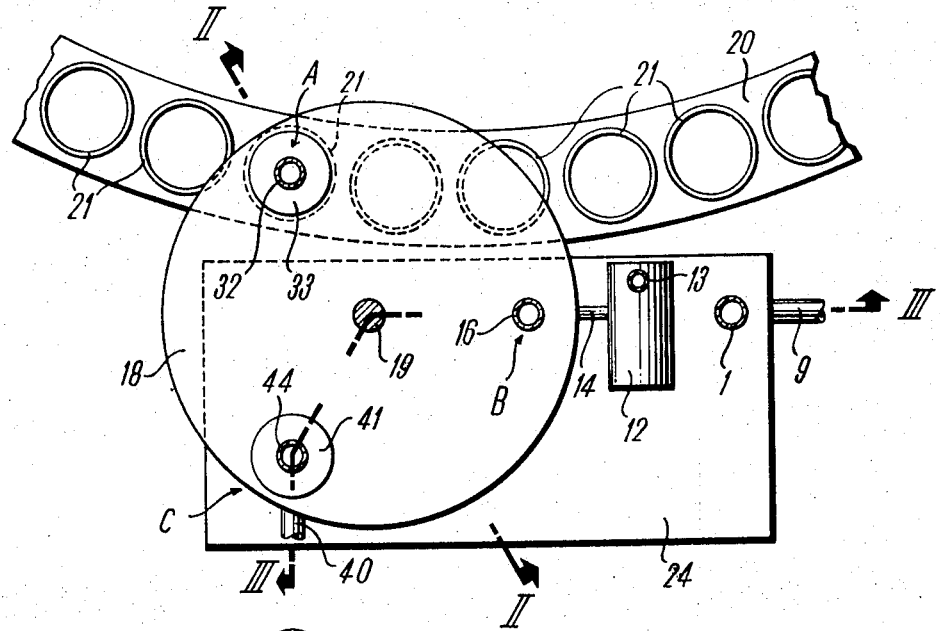
FIG. 1 is a fragmentary top plan view of the preferred embodiment.

The basic structure of the measuring chamber according to the invention may be best observed from FIG. 3. Through a filler tubule 1 an electrolyte is admitted into a reservoir 2 from which the electrolyte flows through a port 3 into a space 4. From the latter the electrolyte is drawn through the measuring opening 5 into the suction chamber 6 and therefrom through a port 7 into the suction chamber 8 which communicates with a suction conduit 9 connected to a vacuum source (not shown).

In the reservoir 2 and in the suction chamber 8 there are disposed, respectively, electrodes 10 and 11 which, when a potential difference exists therebetween, generate an electric field in the measuring opening 5. When a particle passes through the measuring opening 5, this electric field is changed so that at the electrodes a pulse will appear, the amplitude of which is a measure of the volume of the throughgoing particle. The amplitude and the shape of the pulse, on the other hand, depend from the location where the particle enters the measuring opening 5. It is therefore a desideratum to ensure that the particles always enter the measuring opening 5 at the same location so that the amplitude variations which would be caused by the different entrance locations can be eliminated as input variables in the evaluation of the pulses.

The electrolyte is introduced through the filler tubule 1 into the reservoir 2 at such a rate as to maintain the latter at all times approximately two-thirds full.

Into the flow of liquid which is already focused as it nears the measuring opening, there projects an entrance tubule 15 which is formed as a thin-walled elongate capillary tube. The entrance tubule 15 forms a terminus of a supply conduit 14 which extends from the reservoir 12 and projects into the electrolyte flow. The reservoir 12 is supplied through a filler nipple 13. The height of the reservoir 12 is adjustable in order to determine the pressure of the particle suspension which is introduced into the liquid flow through the entrance tubule 15 and thus to turn on or turn off the supply of the calibrating suspension.

Into the flow of the electrolyte upstream of the measuring opening 5 there projects, oriented towards the measuring opening, a further entrance tubule 16, the inlet opening of which is also formed as a thin-walled elongate capillary tube. Its structure is identical to the opening of the entrance tubule 15 to an extent that about the entrance tubules 16 and 15 identical flow conditions prevail. It is noted that asymmetrical characteristics of the flow upstream of the measuring opening caused by the presence of the port 3 have to be taken into account.

Figure 5:
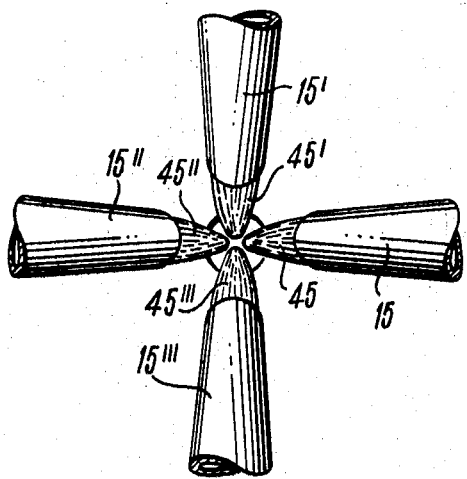

The openings of the entrance tubules 15 and 16 are arranged upstream of the measuring opening 5 in rotational symmetry with respect to the axis of the measuring opening and are spaced at identical distances therefrom. As a result, upon passage of particles drawn through the measuring opening 5 from the entrance tubule 15, on the one hand, and from the entrance tubule 16 on the other hand, there are obtained different passage paths for the particles. Yet, because of their identical distance from the center and from the edge of the measuring opening, these passage paths are theoretically electrically identical with regard to the configuration and amplitude of the measuring pulses generated at the electrodes during the passage of a particle of a given volume. This feature is schematically illustrated in FIGS. 4 and 5 in which there are shown four entrance tubules 15, 15', 15'', 15''' (the latter is not shown in FIG. 4) arranged in a circular array upstream of the measuring opening 5 in such a manner that within the flow of the electrolyte four electrically equivalent particle flow paths 45, 45'45'', 45''' are formed. Their zones within the measuring opening 5 are each at the same radial distance from the center of the measuring opening and also from the edge thereof.

The aforenoted arrangement has several basic consequences. The most important of these resides in the fact that simultaneously with or at a time interval from the measurement of the volume distribution of a certain sample suspension which is drawn through the measuring opening 5 from the entrance tubule 16, a calibrating suspension can be passed through the measuring opening 5. The simultaneous measurement of sample suspensions (entrance tubule 16) and calibrating suspension (entrance tubule 15) is basically possible if the value which is obtained from the measurement of the calibrating suspension (calibrating curve) can be easily separated during evaluation from the effective curve resulting from the measurement of the sample suspension. Such easy separation is possible either when the calibrating curve has substantially only one value (a sole "peak") which is "sitting" on the effective curve (that is, it lies in the range of the values forming the effective curve), or when the values which are obtained from the calibrating suspension and the sample suspension lie in different volume zones, so that during evaluation there are obtained two separate curves: the effective curve and the calibrating curve. It is an assumption here that a coincidence of two particles, for example, a calibrating particle and a sample particle in the measuring opening is statistically highly improbable. Such high improbability is ensured by a relatively high degree of dilution.

A further consequence of the arrangement of a plurality of entrance tubules in the space upstream of the measuring chamber is the possibility to provide a plurality of entrance tubules in a circumferential array as it has already been noted in connection with FIGS. 4 and 5. Thus, without changes in the test setup and/or cleaning of the individual tubules, measurements of several samples may be effected subsequently and/or simultaneously. The simultaneous measurement is of interest when the effective curves are substantially non-intersecting.

Figure 2:
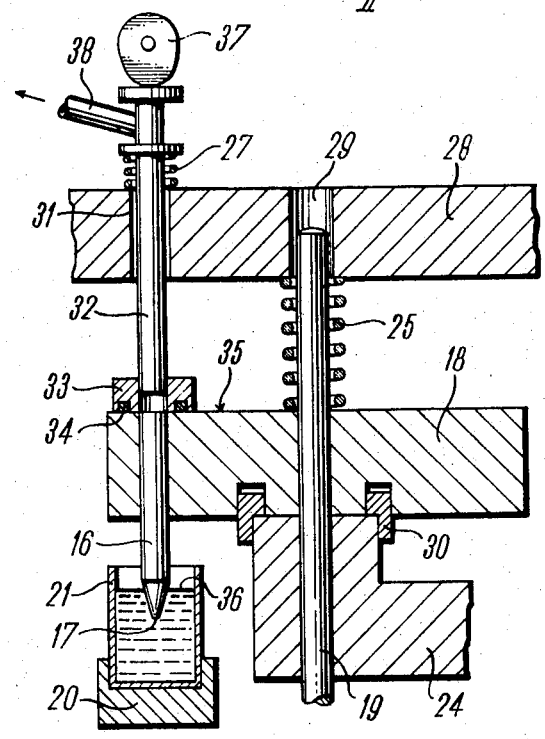
FIG. 2 is a sectional view along line II—II of FIG. 1.

Turning now to FIGS. 1–3, there is shown an arrangement wherein a plurality of entrance tubules are introduced in sequence into the space 4 upstream of the measuring opening 5, so that the sample suspension contained in each entrance tubule may be passed through the measuring opening 5 separately with respect to one another, but simultaneously with the calibrating suspension.

In a rotary disc 18, there are fixedly held three entrance tubules 16. The rotary disc 18 is keyed to a shaft 19 which, in turn, is driven by a drive means through a slipper clutch (not shown). The shaft 19 extends through a bore provided in a base plate 24 which carries stops 30 cooperating with recesses in the disc 18. The upper end of the shaft 19 is received in a bore 29 of a stationary plate 28. By means of a lever 23 keyed to the lower terminus of the shaft 19 the latter may be lifted axially together with the rotary disc 18 and thus may be separated from the stops 30. The rotary disc 18 is then allowed to rotate under the effect of the drive means connected thereto by means of the aforenoted slipper clutch until again, the stops 30 will be in alignment with the corresponding recesses in the rotary disc 18. Upon this occurrence a compression spring 25 disposed between the stationary plate 28 and the disc 18 causes the latter to shift axially towards the base plate 24. As a result, the lugs will nest in the corresponding recesses of the disc 18, arresting its rotary motion.

In the embodiment according to FIGS. 1–3, there are provided three stations in which the rotary disc 18 may be arrested. These stations are the filling station A (FIG. 2), the measuring station B (at the right-hand side of the shaft 19 in FIG. 3) and the cleaning station C (at the left-hand side of the shaft 19 in FIG. 3).

In FIG. 2 there is shown the filling station A. On a sample changer 20, as best shown in FIG. 1, there are serially arranged a plurality of sample holders 21. In the arrested condition of the rotary disc 18, that is, when the latter drops down because of the alignment of the stops 30 with the recesses in the disc 18, one of the entrance tubules 16 fixedly attached to the rotary disc 18 projects to such an extent into the sample holder 21 that the opening 17 of the entrance tubule lies under the liquid level 36. To the upper end of the entrance tubule 16 which is flush with the flat upper face 35 of the rotary disc 18, there is coupled a suction head 33 provided with a seal 34. With the suction head 33 there is associated a tubule 32 which extends through a bore 31 provided in the stationary plate 28 and which, together with the suction head 33, is pressed against the force of a spring 27 by means of an eccentric 37 into engagement with the flat upper face 35 of the rotary disc 18. At the upper opening 38 of the tubule 32 there prevails a vacuum which, after the entrance tubule 16 has been submerged into the sample holder 21, causes a sample suspension to be drawn up into the entrance tubule 16. The spring 27 ensures that the head 33 of the tubule 32 engages the top face 35 of the rotary disc 18 only when it is pressed downwardly by the eccentric 37. The sample suspension remains in the tubule 16 by virtue of the capillary effect.

Each of the entrance tubules 16 is forwarded in succession to the filling station A and is provided with a sample suspension in the aforenoted manner. An appropriate device (not shown) ensures that simultaneously with the arrival of a new entrance tubule 16 to the filling station A, the sample changer 20 is caused to move one step to bring the next sample holder 21 into the station A.

After the filling of an entrance tubule 16, the disc 18 is rotated 120°, whereupon the said entrance tubule 16 arrives into the measuring station B which is shown in FIG. 3 to the right of the shaft 19. Its mode of operation has already been discussed earlier during the course of the basic description of the invention in connection with FIG. 3. Thus, the entrance tubule 16 projects in the station B into the space 4 which is upstream of the measuring opening 5.

Upon a further stepped motion of the disc 18 through 120°, the entrance tubule 16 arrives from the measuring station B into the cleaning station C and is introduced into a chamber 39 (FIGS. 1 and 3). As well seen in FIG. 3, with the upper end of the entrance tubule 16 dwelling at station C there is aligned a suction head 41 which is, in station C, in contact with the upper face 35 of the rotary disc 18 and which is provided with a seal 42. The suction head 41 is connected to the lower end of a tubule 44 which passes through a bore 43 provided in the stationary plate 28 and which, together with the suction head 41, is continuously pressed against the upper face 35 of the disc 18 by a spring 26 disposed between the stationary plate 28 and the suction head 41. The upper end of the tubule 44 is coupled to a vacuum source. The charging of the chamber 39 is effected alternately with air and water ("pulsating" feed), so that in this manner the vacuum effects an alternating cleaning of the entrance tubules with air and water. It is to be understood that any washing or rinsing medium other than water may also be used.

The admission of the calibrating solution into the space 4 may be effected or prevented by adjusting the reservoir 12 with respect to the level of the electrolyte in the reservoir 2.

It is apparent from the foregoing description of the preferred embodiment that the positioning of an entrance tubule so that its axis is offset with respect to the axis of the measuring opening 5 in the free space 4 upstream of the measuring opening according to the German Published Application 2,013,799, makes possible, according to the invention, the simultaneous arrangement of a plurality of inlet tubules and thus makes possible a simultaneous measurement of a sample suspension and a calibrating suspension. This, in turn, leads to a substantial increase in the accuracy of the measuring process and the control thereof. Further, the positioning of the entrance tubule, formed as a thin-walled elongate capillary tube at such a location upstream of the adjacent outer edge of the measuring opening in which the flow field of the liquid is already significantly focused in the direction of the measuring opening, makes possible an interchanging of the entrance tubules while ensuring a very high degree of accuracy in determining the location of passage of the particle flow path through the measuring opening. Both features represent substantial improvements over the measuring chamber disclosed in German Published Application No. 2,013,799. The embodiment according to FIGS. 1–3 incorporates both improvements in a measuring chamber forming the subject of the German Published Application No. 2,013,799.

That which is claimed is:

1. In a measuring chamber for measuring the properties of particles suspended in liquid, said measuring chamber being of the known type that has (a) means defining a measuring opening having an axis, (b) means defining a space upstream of said measuring opening, (c) means driving an electrolytic liquid through said measuring opening, (d) means for generating an electric pulse in response to passage of a suspended particle through said measuring opening, the improvement comprising at least two entrance tubules containing a particle suspension and being disposed in said space, each entrance tubule being formed as a thin-walled elongate capillary tube projecting into said liquid for introducing said particle suspension into said liquid, each entrance tubule having a longitudinal axis being offset with respect to the axis of said measuring opening.

2. An improvement as defined in claim 1, wherein said entrance tubules are disposed in said space in rotational symmetry with respect to the axis of said measuring opening and at identical distances from said last-named axis.

3. An improvement as defined in claim 1, including means for charging at least one of said entrance tubules with a sample suspension and means for charging at least one other of said entrance tubules with a calibrating suspension, particles of said calibrating suspension, when passed through said measuring opening, serve to calibrate said pulses generated upon passage of the particles of said sample suspension through said measuring opening.

4. In a measuring chamber for measuring the properties of particles suspended in liquid, said measuring chamber being of the known type that has (a) means defining a measuring opening having an axis, (b) means defining a space upstream of said measuring opening, (c) means driving an electrolytic liquid through said measuring opening, (d) means for generating an electric pulse in response to passage of a suspended particle through said measuring opening, the improvement comprising
  A. a plurality of entrance tubules each formed as a thin-walled elongate capillary tube,
  B. support means carrying said entrance tubules and
  C. means for the stepwise advancement of said support means to sequentially position said entrance tubules in said space upstream of said measuring opening.

5. An improvement as defined in claim 4, wherein said measuring chamber includes
  A. a filling station for charging said entrance tubules with a sample suspension,
  B. a measuring station including said means defining said measuring opening and said space upstream thereof and
  C. a cleaning station for cleaning said entrance tubules, all three stations being situated along said support means for sequentially receiving said entrance tubules upon said stepwise advancement of said support means.

6. An improvement as defined in claim 5, including
  A. a plurality of sample holding vessels and
  B. sample changer means for sequentially introducing said vessels into said filling station in phase with the sequential introduction of said entrance tubules into said filling station.

7. An improvement as defined in claim 5, wherein said support means is constituted by a rotary disc, said entrance tubules being secured to, and said stations being arranged along, said rotary disc in a circular array.

8. An improvement as defined in claim 7, wherein said filling station includes
  A. a suction head in fluid tight sliding contact with one face of said rotary disc, said suction head being in communication with one end of the entrance tubule positioned in said filling station,
  B. a sample suspension holder into which extends the other end of said entrance tubule positioned in said filling station and
  C. vacuum means associated with said suction head for drawing a sample suspension from said sample suspension holder into said entrance tubule positioned in said filling station.

9. An improvement as defined in claim 7, wherein said cleaning station includes
  A. a suction head in fluid tight sliding contact with one face of said rotary disc, said suction head being in communication with one end of the entrance tubule positioned in said cleaning station,
  B. a chamber containing cleaning fluid into which extends the other end of said entrance tubule positioned in said cleaning station and
  C. vacuum means associated with said suction head for drawing cleaning fluid from said chamber through said entrance tubule positioned in said cleaning station.

10. In a method of measuring properties of particles of sample suspensions in a measuring chamber, said method including the known steps of (a) driving an electrolytic liquid through a measuring opening of said measuring chamber, (b) introducing in a space upstream of said measuring opening into the flow of said electrolytic liquid said particles of a sample suspension through an entrance tubule formed as a thin-walled elongate capillary tube, (c) generating an electric field across said measuring opening and (d) sensing the electric pulses generated in said measuring chamber in response to the passage of said particles through said measuring opening, the improvement comprising the step of introducing in said space, into said flow and within each measuring process relating to one sample suspension, a calibrating suspension through another entrance tubule formed as a thin-walled elongate capillary tube for calibrating said electric pulses.

11. A method as defined in claim 10, wherein the flow field of the particle path of the sample suspension within the measuring opening and the flow field of the particle path of the calibrating suspension within the measuring opening are at identical radial distances from the axis of said measuring opening and are at identical radial distances from the edge of said measuring opening.

12. A method as defined in claim 11, wherein the step of introducing particles of a sample suspension into said flow and the step of introducing particles of a calibrating suspension into said flow are performed simultaneously.

13. In a method of measuring properties of particles of sample suspensions in a measuring chamber, said method including the steps of (a) driving an electrolytic liquid through a measuring opening of said measuring chamber, (b) introducing in a space upstream of said measuring chamber into the flow of said electrolytic liquid said particles of a sample suspension through an entrance tubule formed as a thin-walled elongate capillary tube, (c) generating an electric field across said measuring opening, and (d) sensing the electric pulses generated in said measuring chamber in response to the passage of said particles through said measuring opening, the improvement comprising:

A. providing a plurality of tubules in a rotating turn table, which is intermittently rotated such that each of the tubules is brought to a standstill in at least first, second and third positions;

B. intermittently driving a gas and a wash liquid alternately through each tubule when in said first position;

C. introducing sample suspension into each tubule when in said second position; and D. expelling the contents of the tubules when in said third position into the space before said measuring opening for the purpose of introducing the contents of the individual tubules into the same, whereby the steps (B), (C), and (D) are carried out simultaneously on different tubules in succession.

* * * * *